Dec. 7, 1965  W. L. KING ETAL  3,221,610
CLUTCH TYPE PISTON LOCKING MEANS
Filed Jan. 13, 1964  2 Sheets-Sheet 1
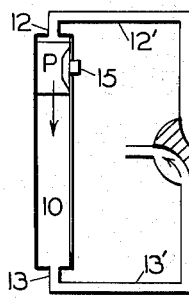
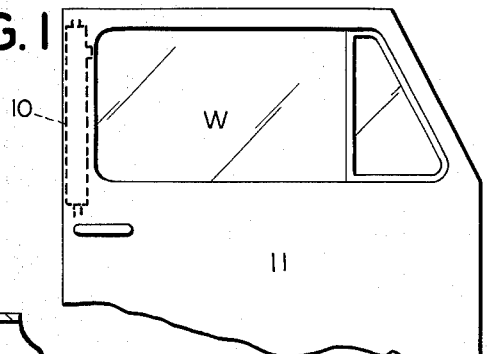
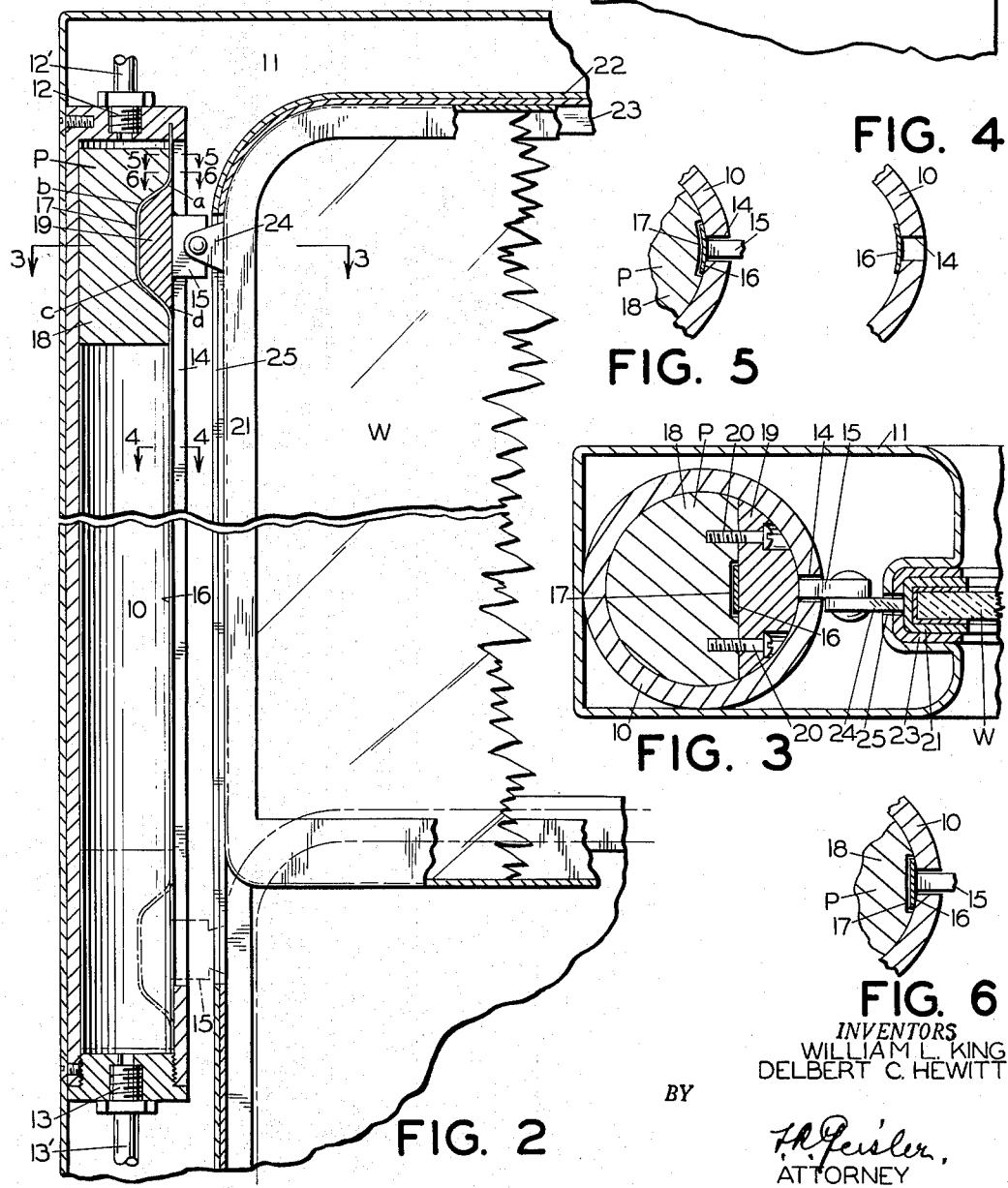
INVENTORS
WILLIAM L. KING
DELBERT C. HEWITT
BY
T. R. Geisler,
ATTORNEY

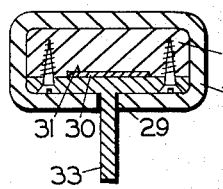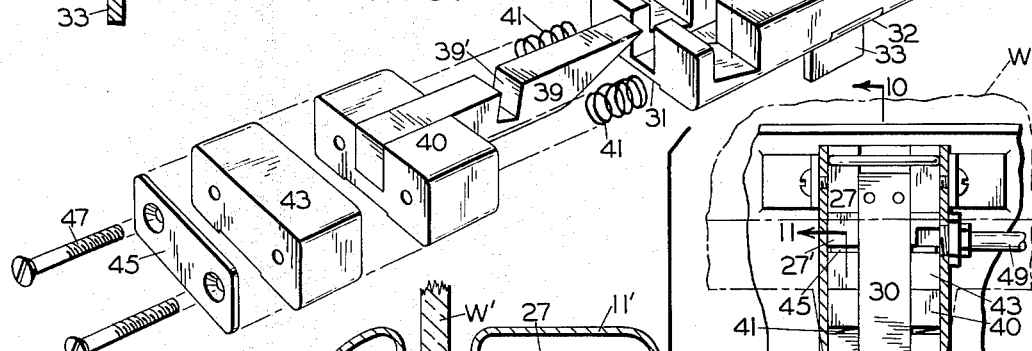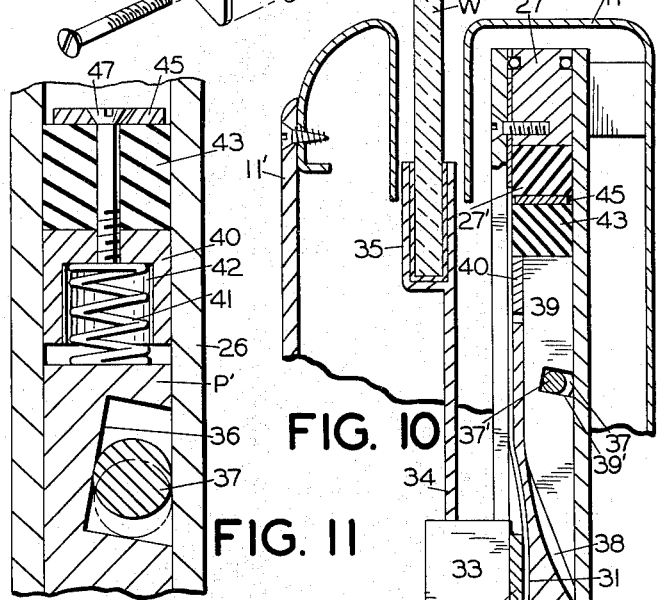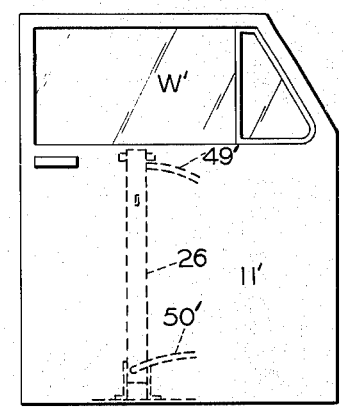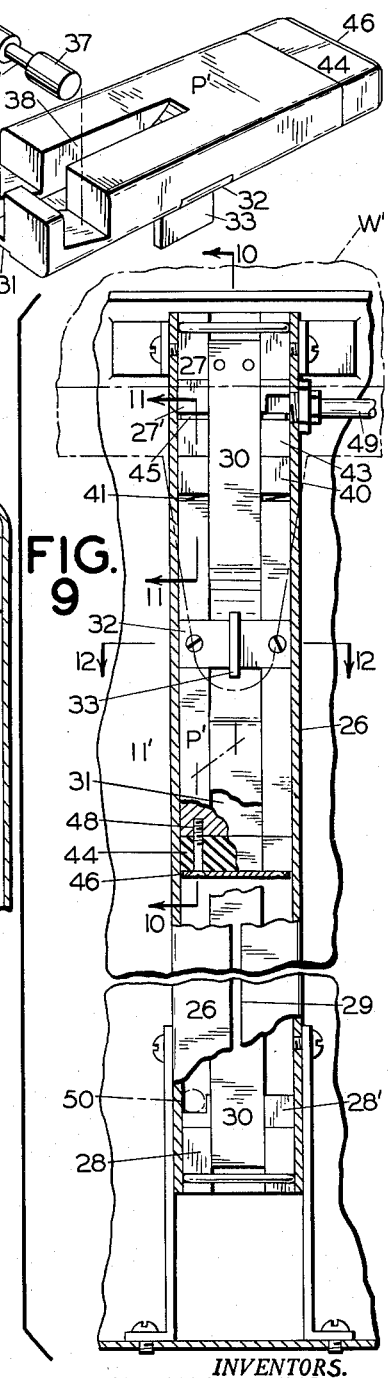

ically controlled double-acting air cylinder.

As is well known, with double-acting cylinders and pistons, the resulting movement and driving power of the piston is customarily transmitted through the medium of a piston rod which is slidable through one end of the cylinder. However this standard construction and arrangement requires sufficient space beyond the end of the cylinder for the travel of the piston rod with which the work is connected, and consequently this arrangement cannot be used when sufficient space beyond the cylinder for the piston rod to travel is not available. The employment of a flexible cable attached to both sides of the piston and passing through the corresponding ends of the cylinder is not practicable since it involves a sealing problem with such cable.

The object of the present invention is to provide a novel and improved double-acting cylinder and piston assembly in which the power and movement of the piston will be transmitted to the work without the employment of the customary piston rod as the transmitting means, or without attempted use of a flexible cable.

One of the places where it has been found that a double-acting air cylinder and piston could effectively be used, were it not for the necessity of having space beyond the top of the cylinder for piston rod travel, has been at locations adjacent windows in truck cabs, as well as in other vehicles, where the window is remote from the driver and where it is desirable to provide means enabling the driver to operate such window without moving from his position and by employing the compressed air system with which the vehicle is supplied.

A specific object of this invention accordingly is to provide a novel double-acting air cylinder and piston assembly, particularly adapted for operating a vehicle window, and located adjacent a side of such window, and without such assembly having the usual piston rod extending through an end of the cylinder.

The means by which these objects and incidental advantages are attained, the manner in which the novel assembly of the present invention is constructed, and the manner in which it functions, will be briefly described and explained with reference to the accompanying drawings.

In the drawings:

FIG. 1 is a fragmentary elevation, more or less diagrammatic, illustrating one way in which the device of the invention may be employed for operating a window in the cab door of a truck;

FIG. 2 is a fragmentary foreshortened sectional elevation of the double-acting cylinder and piston and the adjacent portion of the window as illustrated in FIG. 1 showing the connecting means between window and piston and the mounting of the cylinder adjacent the window in the door frame;

FIG. 3 is an enlarged fragmentary section on line 3—3 of FIG. 2;

FIG. 4 is a fragmentary section on line 4—4 of FIG. 2 drawn to the same scale as FIG. 3;

FIG. 5 and 6 are similar fragmentary sections on line 5—5 and line 6—6 of FIG. 2 respectively;

FIG. 7 is a simple diagram illustrating the operating control for the cylinder and piston assembly;

FIG. 8 is a fragmentary elevation illustrating how the invention may be employed in a modified form for operating the vehicle window;

FIG. 9 is a fragmentary foreshortened sectional elevation of the double-acting cylinder and piston and the adjacent portion of the window in the arrangement as indicated in FIG. 8;

FIG. 10 is a fragmentary section on line 10—10 of FIG. 9 but drawn to a larger scale;

FIG. 11 is a section on line 11—11 of FIG. 9 drawn to a larger scale;

FIG. 12 is a transverse section on line 12—12 of FIG. 9 drawn to the same scale as FIG. 10; and FIG. 13 is an exploded view in perspective showing the components of the piston assembly and included brake means.

Referring first to FIG. 2, the air cylinder 10 is shown mounted in the side of the door frame 11 adjacent the window W. The window is mounted for sliding up and down in the door frame as is customary, and in this figure the window is indicated in full lines in upper closed position and in broken lines in completely lowered position.

The top and bottom ends of the cylinder 10 are provided with ports 12 and 13 respectively, both of which ports are connected by air lines 12' and 13' respectively, with a suitable control valve V (see FIG. 7) of well-known type, by means of which either port can be connected to a source of compressed air (not shown) and the other connected to exhaust. A piston P is slidable up and down in the cylinder 10.

The cylinder 10 is provided with a narrow slot 14 (see also FIGS. 3 and 4) which extends longitudinally in the cylinder wall for almost the entire length of the cylinder, and extends along the portion of the wall nearest the window so that this slot extends substantially in the same vertical plane as the window and as the axis of the cylinder. The purpose of this slot 14 is to accommodate an arm 15 of the piston which extends out from the piston beyond the cylinder through the slot 14, and the slot 14 is only slightly wider than the thickness of the arm 15.

A thin, semi-flexible strip of material, preferably metal, 16 (FIGS. 2 and 4) is placed on the inside of the cylinder 10 so as to cover the slot 14 above and below the location of the piston P. The ends of the strip 16 are firmly secured at the top and bottom of the cylinder respectively. The strip 16 extends through a specially shaped channel 17 provided in the piston P as presently explained.

Referring to FIGS. 2 and 3, the cylindrical piston P is comprised of two component parts namely a main body portion 18 and an insert portion 19 which is so shaped as to fit a bow-shaped cavity formed in the main body portion of the piston and which extends longitudinally in the wall of the main body portion. The shape of this cavity and thus of the inset portion which exactly fits the cavity and which completes the composite cylindrical piston will be understood from FIGS. 2 and 3. The channel 17 for the flexible strip 16 is formed first as a groove along this cavity in the side of the main body portion 18 and extends along the same plane as the axis of the cylinder and piston, and thus extends centrally along the wall of the bow-shaped cavity into which the inset portion 19 fits. The inset portion 19 is secured to the main body portion 18 by suitable screws shown at 20 in FIG. 3. In this way a covered passageway or channel is provided for the flexible strip 16 and thus part of the flexible strip extends along through the piston and inside the inset portion 19 regardless of the position of the piston in the cylinder.

Above and below the piston the semi-flexible strip 16 which covers the slot 14 will be slightly convex, as indicated in FIG. 4, conforming to the curvature of the inside wall of the cylinder 10 under the pressure in the cylinder, and the air pressure (or other fluid pressure) in the cylinder, by keeping this strip pressed against the cylinder wall, will effiectively provide satisfactory cover closure for the slot opening except where the piston itself is located, while the composite piston provides the covering for the slot where the piston is located.

Inasmuch as the strip 16 will be held in convex cross sectional shape, except where it passes through the piston, the strip must be made to assume a flat cross sectional shape before it can pass through the longitudinally curved channel 17 provided in the composite piston P. In order to flatten out the strip 16 so that it can pass freely through the channel in the piston the channel 17 at the top and bottom of the piston changes from transversely curved shape, as illustrated in FIG. 5, to the shape which is flat or straight across, as illustrated in FIG. 6. Then, when the strip 16 has been flattened out it bends easily transversely to accommodate itself to the transverse curves *a, b, c,* and *d* (FIG. 2) in the piston channel 17. At the other or bottom end of the piston the channel 17 similarly changes shape from transversely straight across to transversely convex as the strip 16 emerges from the piston channel.

It will be apparent now that the piston P can move up and down in the cylinder 10 and that the strip 16 will pass through the channel 17 upon the relative movement of the strip with respect to the piston, and that the strip will accommodate itself to the channel path in the piston without the fear of breaking or of any great amount of fatiguing. Furthermore it is apparent that the air pressure necessary for operating the piston will tend to keep the strip 16 pressed against the slot 14 in the cylinder wall at every point along the cylinder slot except at the location where the piston momentarily happens to be.

In the carrying out of this invention it has been found very satisfactory to use thin flexible steel for the strip 16, such as the flexible steel from which the steel tapes are made which are used by surveyors, etc. However presumably the strip could be satisfactorily made from other materials, particularly plastic.

Referring now to FIG. 3, the glass pane of the window W is shown cemented in the usual metal frame 21 which is slidably mounted in the groove provided in the door frame 11, the groove being lined with suitable rubber or felt 23 as usual.

An arm 24 is welded to the metal window frame 21 and extends out througfh a vertical slot 25 provided in the groove of the door frame and through a registering slot provided in the groove liner 23. This arms 24 is attached by cross pin or bolt to the arm 15 of the composite piston P, or, more exactly, is attached to the arm on the inset portion 19 of the composite piston P. Thus up and down movement of the piston P in the air cylinder 10 results in the desired up and down movement of the window W. Obviously, the two way control valve V (FIG. 7) for the branch air lines 12′ and 13′ which lead to the ports 12 and 13 respectively at the bottom and top of the cylinder 10, can be placed at any desired location remote from the window and thus, for example, in convenient accessibility to the driver of the vehicle.

Referring now to the modified construction illustrated in FIGS. 8–13, wherein 11′ indicates the vehicle door as a whole and W′ indicates the window in the same, the window being mounted for up and down movement, the double-acting cylinder 26 in this case is located in the door frame 11′ below the window opening instead of being located at one side of the window opening, as in the construction previously described, and with this construction it is assumed there is not room at the side of the window in the door frame for the double-acting cylinder and associated parts and consequently the double-acting cylinder must be located below the window. Furthermore in this modified construction the double-acting cylinder 26, instead of being actually cylindrical or circular in cross section, is made rectangular in cross section. It is possible, by having the cylinder rectangular in cross section, to reduce the overall thickness of the cylinder to such extent that there will be ample room for the cylinder within any ordinary vehicle door frame even though the spacing between the outer and inner walls of the door frame may be quite limited.

Referring to FIG. 9, the top and bottom ends of the rectangular cylinder 26 are closed by suitable plugs 27 and 28 respectively. A cushioning bumper 27′ is placed beneath the top plug 27 and a similar cushioning bumper 28′ is placed above the bottom plug 28 to cushion the impact of the piston in the event the piston travels the entire distance to the top or bottom of the cylinder. The top and bottom ends of the rectangular cylinder 26 are provided with ports 49 and 50 respectively to which air lines 49′ and 50′ (FIG. 8) are connected respectively through a simple control valve similar to that shown in FIG. 7. A rectangular piston P′ is slidable up and down in the rectangular cylinder 26.

The rectangular cylinder 26 is provided with a narrow slot 29 (FIGS. 9, 10 and 12) which, like the slot 14 in the previously described cylinder of FIGS. 2 to 5, extends longitudinally for almost the entire length of the cylinder 26. A thin semi-flexible strip of material 30, preferably metal, like the strip 16 previously described, extends along on the inisde of the slot 29 so as to cover the slot, the ends of the strip being secured in the plugs 27 and 28 at the top and bottom of the cylinder respectively. A channel 31 for the strip 30 is provided in the face of the piston P′. This channel is deepened near the mid section of the piston to enable the strip 30 to pass beneath a cross bar 32 the ends of which cross bar are secured in recesses provided in the face of the piston on opposite sides of the deepened portion of the channel 31. This channel and guideway for the flexible strip 30 is provided throughout the entire length of the piston assembly and the flexible strip 30 is in contact with the wall of the cylinder along the inside of the slot 29 at all times over the entire length of the slot except at the particular location on the piston where the strip is diverted inwardly in the mid section of the piston so as to pass under the cross bar 32 on the piston.

An outwardly extending rib 33 is welded to, or formed integral with the cross bar 32 and extends out through the slot 29 of the cylinder. The outwardly extending rib 33 engages a bracket 34 (FIGURE 10) supporting the metal frame 35 in which the glass panel of the window is mounted.

In order to hold the piston P′ (and therewith the window W′) firmly against any inadvertent downward settling movement when the piston is not being operated, the piston is provided with a spring-actuated clutch type brake which will now be described. The body portion of the piston P′, as best shown in FIG. 13, is formed with a transversely-extending slot 36 on the face opposite the face on which the channel 31 for the flexible strip 30 is located. The depth of this slot 36 decreases from bottom to top (see also FIG. 11). A clutch brake roller 37 is carried in the slot 36. This roller has a center portion 37′ of reduced diameter.

A central, longitudinally-extending slot 38, leading downwardly from the top of the main body portion of the piston P′, crosses the transverse slot 36 and slidingly accommodates a roller control bar 39. This control bar 39 has a slot 39′ which receives the center portion 37′ of the clutch brake roller 37. Thus, as will be apparent from FIGS. 10, 11 and 13, movement of the control bar 39 controls the position of the roller 37 in the clutch slot 36.

The control bar 39 is secured in a top member 40 (FIGS. 10, 11 and 13) of the piston assembly, which top member has the same cross sectional area as the main body portion of the piston P'. A pair of coil springs 41 have their upper ends set in recesses 42 provided in the lower face of member 40, one of these recesses being shown in FIG. 11. The bottom ends of these springs bear against the top of the main body portion of the piston P'. These springs, by normally keeping the top member 40 spaced from the main body portion of the piston, and by keeping the control bar 39 normally in raised position, hold the clutch brake roller 37 in upper position and thus in wedging position between the piston and the wall of the cylinder 26. In such position the roller 37 prevents downward movement of the piston in the cylinder but does not prevent upward movement of the piston. However, downward pressure on the top member 40 against the force of the springs 41 results in positioning the roller 37 lower down in the slot 36 and out of wedging or clutching engagement and thereupon permits downward movement of the piston in the cylinder to take place as long as the top member 40 continues to be pressed down.

A cushioning block 43, surmounted by a plate 45 and secured to the top of member 40 by screws 47, and a similar cushioning block 44 and plate 46, secured by screws 48 to the bottom end of the main body portion of the piston, complete the piston assembly.

Thus the delivery of air under pressure into the bottom of cylinder 26 will raise the piston P' since the clutch brake roller 37 permits upward movement of the piston, and the clutch brake roller 37 will hold the piston against inadvertent downward movement when the air is shut off. However, the delivery of air under pressure into the top of the cylinder, when it is desired to move the piston downwardly, will first act to move the member 40 downwardly against the force of the springs 41. This moves the clutch brake roller 37 into inoperative position and causes the piston to be moved downwardly with the continued delivery of air under pressure into the top of the cylinder.

If the cylinder were to be positioned in horizontal instead of vertical position, and if it were desired to have brake means definitely preventing any possible inadvertent moving of the piston in either direction, then obviously an additional clutch brake assembly could be provided at the opposite end of the piston, identical to the one described but oppositely arranged.

While the invention has been illustrated and described as employed for operating vehicle windows, where there would be no room for the travel of the customary rod beyond the end of a cylinder, it is not intended that the invention be limited to this specific employment. Obviously, the invention may be employed in other devices and for other uses. Also it would be possible to make further modifications in the cylinder and piston assembly without departing from the principle of the invention.

It is understood that the terms "cylinder" and "double-acting cylinder" as herein used are intended to include cylinders which have the customary circular cross section, and also to include "cylinders" of any cross sectional shape in which it would be feasible to install an air piston, particularly an air "cylinder" of rectangular cross section as illustrated and described.

We claim:

1. In a double acting cylinder in which the pair of ports are located at opposite ends of the cylinder respectively to serve alternately as inlet and outlet ports for actuating fluid delivered into the cylinder through the intermediary of a suitable master control valve, a piston assembly having an automatic clutch-type brake, said piston assembly including a piston main member, said main member having an open transverse slot extending across said main member, the bottom of said slot extending in a plane oblique to the longitudinal center line of the cylinder and of said piston main member so as to have a low side of greater depth and a high side of less depth, a clutch roller in said slot of proper size to have clutching engagement with the cylinder wall when said roller moves from the low side towards the high side of said slot bottom, said piston main member having a second slot extending in longitudinal direction into said main member from the end of said main member nearest the high side of said first mentioned slot bottom and traversing said first mentioned slot, a clutch control bar slidable in said second slot, means on said control bar engaging said clutch roller so as to cause movement of said clutch roller in said first mentioned slot when said control bar is moved in said piston main member, a secondary piston member located beyond said end of said piston main member, said control bar secured to said secondary piston member, and spring means interposed between said piston main member and said secondary piston member and normally acting to cause said control bar to pull said clutch roller toward said high side of said first mentioned slot bottom, whereby said clutch roller and control bar and spring means will act to prevent travel of said piston assembly in the cylinder in one direction except when the actuating fluid in said cylinder thrusts said secondary piston closer to said piston main member against the force of said spring means, thereby automatically causing said clutch roller to be moved by said control bar into releasing position.

2. A vehicle window operating assembly including a double acting cylinder mounted near the vehicle window on a substantially vertical axis, a composite piston in said cylinder, said composite piston including a piston main member, said piston main member having a substantially horizontal slot extending across said main member, the bottom surface of said slot extending in the plane oblique to the longitudinal center line of said piston main member and said cylinder and the lower side wall of said slot having a greater depth than the upper side wall of said slot, a clutch roller in said slot of proper size to have clutching engagement with the cylinder wall when said roller moves upwardly in said slot from the lower side wall, said piston main member having a second slot extending longitudinally into said main member from the top of said main member and traversing said first mentioned slot, a clutch control bar slidable in said second slot, means on said control bar engaging said clutch roller so as to cause movement of said clutch roller when said control bar is moved with respect to said piston main member, a secondary piston member located above the top of said piston main member, said control bar secured to said secondary piston member, spring means interposed between said piston main member and said secondary piston member normally acting to cause said control bar to pull said clutch roller upwardly in said first mentioned slot so as to cause said clutch roller to act to prevent downward travel of said piston assembly in the cylinder except when the actuating fluid passing into the top of said cylinder thrusts said secondary piston down closer to said piston main member against the force of said spring means and thereby automatically releases said clutch roller, said cylinder having a slot extending longitudinally along the wall of said cylinder substantially from the bottom to the top of said cylinder parallel to the cylinder axis, an arm on said piston main member extending outwardly through said slot, a flexible strip extending along on the inside of said cylinder and over said slot except where said piston main member is positioned, the ends of said strip secured in said cylinder near the top and bottom of said cylinder respectively, a guideway through said piston main member for said strip, said guideway causing said strip to be removed from said cylinder slot within the area covered by said piston main member, and means connecting said arm on said piston main member with the vehicle window.

(References on following page)

References Cited by the Examiner

UNITED STATES PATENTS

| | | | |
|---|---|---|---|
| 651,864 | 6/1900 | Kelly | 92—88 |
| 2,109,128 | 2/1938 | Carrillo | 92—88 |
| 2,200,427 | 5/1940 | Merz | 92—88 |
| 2,364,715 | 12/1944 | Horton et al. | 92—28 |
| 2,449,516 | 9/1948 | Shakespeare et al. | 92—23 |
| 2,473,430 | 6/1949 | Hoffar | 92—88 |
| 2,632,425 | 3/1953 | Grover | 92—28 |

FOREIGN PATENTS

| | | |
|---|---|---|
| 470,088 | 8/1937 | Great Britain. |
| 48,261 | 1/1921 | Sweden. |

SAMUEL LEVINE, *Primary Examiner.*

RICHARD B. WILKINSON, *Examiner.*